(No Model.)
I. O. PHILLIPS.
SELF ADJUSTING TURN BUCKLE.
No. 346,771. Patented Aug. 3, 1886.
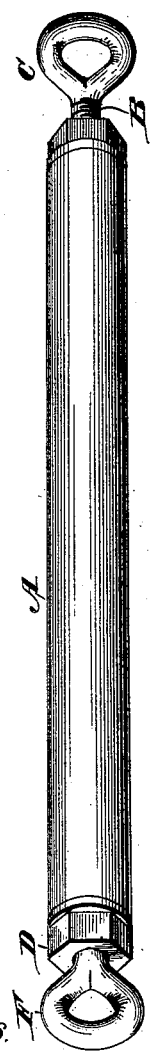
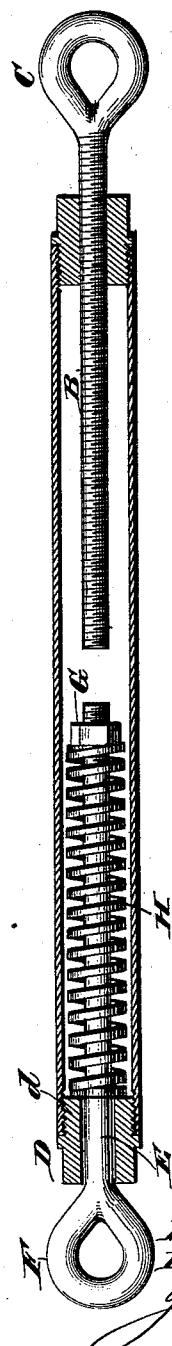
Witnesses.
Robert Surrett
Geo. W. Rea
Inventor.
Isaac O. Phillips
By
James L. Norris.
Atty.

United States Patent Office.

ISAAC OGDEN PHILLIPS, OF BROOKLYN, NEW YORK.

SELF-ADJUSTING TURN-BUCKLE.

SPECIFICATION forming part of Letters Patent No. 346,771, dated August 3, 1886.

Application filed January 9, 1886. Serial No. 188,146. (No model.)

*To all whom it may concern:*

Be it known that I, ISAAC OGDEN PHILLIPS, a citizen of the United States, residing at Brooklyn, in the county of Kings and State of New York, have invented new and useful Improvements in Self-Adjusting Spring Turn-Buckles, of which the following is a specification.

The object of my invention is to provide an improved self-adjusting and elastic coupling and fastening for the various parts of the standing rigging of ships and for bracing the smoke-stacks of steam-vessels.

My invention consists of a turn-buckle embodying a tubular body in one end of which is inserted a longitudinally-adjustable screw-rod carrying an eye or hook at its outer extremity, the opposite end of said tubular body being provided with a screw-cap through which is passed a rod having a hook or eye at its external end, and surrounded within the tubular body with a spiral spring one end of which bears against the inner end of the cap, and the other end against a nut on the end of said rod.

In the annexed drawings, illustrating the invention, Figure 1 is a perspective view of my improved turn-buckle, and Fig. 2 is a longitudinal section of the same.

Referring to the drawings, the letter A represents a tubular body of any suitable length and diameter. One end of the tube A has a threaded opening, through which is passed a screw-rod, B, that is provided at the outer end with a hook or eye, C, for attachment to the rigging of a vessel, or in any situation where an adjustable and elastic coupling is required. The opposite end of the tube A is also internally threaded, and is closed by a screw-cap, D, having a correspondingly-threaded shank, *d*, that fits lightly into the end of the tube.

The cap D is perforated centrally for the passage of a loosely-fitting rod, E, having an eye or hook, F, at its outer end, and provided at its inner end with screw-threads for attachment of a nut, G, by which a spiral spring, H, is held in place. This spiral spring H is located within the tube A, and encircles the rod E between the cap-shank *d* and the nut G, which thus form bearings for the opposite ends of said spring.

It will be observed that the spring H is so adjusted by means of the nut G as to hold the hook or eye F normally in contact with the outer face of the cap D and yet the spring is sufficiently compressible to enable the rod E to be partly withdrawn from the tube.

The device is employed as a coupling or fastening by attaching the opposite hooks or eyes, C and F, to the parts to be connected. It is obvious that by rotating the tube A with relation to the screw-rod B so as to partially withdraw the latter or return it to the tube the device can be lengthened or shortened to any required adjustment. It will thus be seen that while the eyes C and F are attached to fixed points the coupling is lengthened or shortened by simply rotating the tube A in one direction or the other, as required. By means of the spring H the coupling or buckle is also self-adjusting under strain applied longitudinally.

As a fastening for smoke-stack braces the turn-buckle is employed by connecting one of the eyes C or F to the lower end of the brace, while the other is secured to the deck. The device can also be used in a similar manner as a self-adjusting fastening or coupling for standing rigging and for other purposes, thus affording a yielding fastening and coupling and avoiding injury from sudden strain.

I am aware that a spring turn-buckle has heretofore been composed of a tube containing rubber disks, through which pass a bolt having a nut at its inner end and an eye at its outer end, combined with a screw swiveled in one end of the tube, and a stirrup having at one end a head, in which the screw is tapped, and at the other end pivoted to a strap, so that by turning the screw the stirrup is moved longitudinally thereon. This construction does not constitute my invention, and is not claimed by me. It is complicated and expensive, and, besides, is simply a spring attachment to a turn-buckle. In my invention the screw is tapped directly into one end of the tube which contains the spring and eyebolt, and is movable longitudinally in the tube, while the whole comprises a very simple, efficient, and comparatively inexpensive device.

Having thus described my invention, what I claim is—

A spring turn-buckle consisting of a tube, a longitudinally-movable screw tapped through one end of the tube and entering the same, and provided at its outer end with an eye or hook, a cap fitted in the opposite end of the tube, a rod having an eye or hook and passing into the tube and provided with a head at its inner end, and a spring interposed between the cap and the head of the rod, substantially as shown and described.

In testimony whereof I affix my signature in presence of two witnesses.

ISAAC OGDEN PHILLIPS.

Witnesses:
W. B. HEDGEDON,
L. B. LEVENS.